United States Patent [19]
Kimura et al.

[11] Patent Number: 4,862,358
[45] Date of Patent: Aug. 29, 1989

[54] SIGNAL PROCESSING METHOD IN AUTORADIOGRAPHY

[75] Inventors: Tsutomu Kimura; Kazuhiro Hishinuma, both of Kaisei, Japan

[73] Assignee: Fuji Photo Film Co., Ltd., Kanagawa, Japan

[21] Appl. No.: 883,139

[22] Filed: Jul. 8, 1986

Related U.S. Application Data

[63] Continuation of Ser. No. 568,873, Jan. 6, 1984, abandoned.

[30] Foreign Application Priority Data

Jan. 8, 1983 [JP] Japan .................................. 58-1337
Jan. 8, 1983 [JP] Japan .................................. 58-1338
Jan. 8, 1983 [JP] Japan .................................. 58-1343
Jan. 8, 1983 [JP] Japan .................................. 58-57416

[51] Int. Cl.$^4$ .............................................. G01T 1/29
[52] U.S. Cl. ........................................ 364/413; 382/6
[58] Field of Search ............... 364/413, 414; 435/35, 435/803, 808; 382/6; 935/76, 77

[56] References Cited

U.S. PATENT DOCUMENTS

Re. 31,847  3/1985  Luckey ............................. 250/372.2
4,239,968  12/1986  Kotera et al. .................. 250/459.1 X
4,315,179   2/1982  Kato et al. ..................... 364/414 X
4,317,318   2/1982  Kato et al. ..................... 364/414 X
4,320,415   3/1982  Jones .................................. 382/6 X
4,496,973   1/1985  Horikawa et al. ............... 364/414 X
4,526,865   7/1985  Silman ................................. 435/803

Primary Examiner—Jerry Smith
Assistant Examiner—Charles B. Meyer
Attorney, Agent, or Firm—Gerald J. Ferguson, Jr.

[57] ABSTRACT

A signal processing method in autoradiography for obtaining information on the one dimensional location of radioactively labeled substances in a sample where the substances of the sample are distributed in at least one row on a support medium where the information is in the form of symbols, numerals or a combination thereof. The method at least includes the steps of (1) generating digital image data where the data comprises sets of digital signals corresponding to the autoradiograph including the row of distributed substances and where the sets of digital signals may respectively represent successive linear portions of the autoradiograph; (2) scanning selected digital signals of the digital image data to generate at least one further signal representative of a predetermined portion of the row of distributed substances where the position of the predetermined portion is at least partially determined by its location in the scanning direction and the amount of radioactively labeled substance at the location is at least partially determined by the amplitude of the further signal; (3) processing the further signal with either or both of smoothing and threshold-processing to detect sampling point corresponding to the location of the predetermined portion of the row of distributed substances; (4) obtaining the image data digital corresponding to the autoradiograph having the locational information on the radioactively labeled substances where the digital image data is obtained by utilizing a radiation image recording and reproducing method employing a radiosensitive material. A signal processing method for determining the base sequence of DNA is also disclosed.

30 Claims, 10 Drawing Sheets

SIGNAL PROCESSING METHOD IN AUTORADIOGRAPHY

This is a continuation of application Ser. No. 568,873, filed Jan. 6, 1984, now abandoned.

BACKGROUND OF THE INVENTION

1. Field of the Invention

This invention relates to a signal processing method in autoradiography, and more particularly to a signal processing method in autoradiography employing a radiosensitive material.

2. Description of the Prior Art

Autoradiography has been known as a method for obtaining locational information on radioactively labeled substances distributed in at least one dimensional direction to form a row on a support medium.

For instance, the autoradiography comprises steps of: labeling organism-originating biopolymers such as proteins or nucleic acids with a radioactive element; resolving the radioactively labeled biopolymers, derivatives thereof, or cleavage products thereof (referred to hereafter as "radioactively labeled substances") on a gel support (support medium) through a resolving process such as electrophoresis to form a resolved pattern of the radioactively labeled substances (the resolved pattern is not visible); placing said gel support and a high-sensitivity type X-ray film together in layers for a certain period of time to expose said film and developing said film to give the autoradiograph of the resolved pattern as a visible image on the film; and obtaining the locational information of the radioactively labeled substances from said visible image. Further, the identification of the polymeric substances, determination of molecular weight of the polymeric substances and isolation of the polymeric substances can be obtained based on the observed locational information. Such autoradiography has been effectively utilized for determining the base sequence of nucleic acids such as DNA or like.

In the autoradiography utilizing the above-described radiographic process, the visualization of the autoradiograph having the locational information on radioactively labeled substances on a radiographic film is essentially required.

Investigators generally analyze the distribution of the radioactively labeled substances on a support medium through study of the visualized autoradiograph. Further, the visually-obtained locational information on the radioactively labeled substances is generally subjected to various analyses to study the characteristics and functions of the radioactively labeled substance.

Since the autoradiography requires visual analysis of the autoradiograph, there is a drawback in that the locational information on the radioactively labeled substances obtained by analysis of the visualized autoradiograph varies or fluctuates depending on the skill of investigators, and the accuracy of the information is limited to a certain extent. Particularly, when the autoradiograph visualized on a radiographic film shows an image of reduced quality (in regard of sharpness, contrast, etc.), satisfactory information can be hardly obtained and the accuracy is low. In order to improve the accuracy of the locational information, for instance, a visualized autoradiograph can be scanned with a device such as a scanning densitometer. However, such scanning process requires increased operation time and complicated procedures. Further, there is a limitation on increase of the accuracy obtainable when using the above device.

For instance, in carrying out the exposing procedure, the support medium carrying the above-mentioned resolved rows thereon and the radiographic film sometimes cannot be accurately arranged together in layers. In such case, the resolved rows, namely, rows of resolved substances (e.g., electrophoretic rows) visualized on the radiographic film are not parallel and thus the longitudinal direction of the film to give a dislocated pattern. As a result, error is introduced into the visual analysis of the locational information on the radioactively labeled substances to decrease the accuracy thereof.

Further, the rows of the resolved radioactively labeled substances on the support medium are sometimes non-parallel to the longitudinal direction of the support medium or distorted, depending on the kind of support medium or resolving conditions. For instance, a gel support medium is generally held between two glass plates in the resolving procedure because the gel lacks a self-supporting property. As a result, the gel occasionally becomes uneven in the thickness due to deformation of the covers (i.e. the glass plates) and accordingly the radioactively labeled substances are not always resolved uniformly on the gel. The lack of uniformity of the resolved pattern is also caused by air foams contained in the gel or by heterogeneous dispersion of the composition of gel. For these reasons, a phenomenon such as the so-called smiling effect is often observed. In this phenomenon, the migration distance of the resolved row in the vicinity of the center of the support medium is longer than the migration distances on the both sides thereof. Additionally, in electrophoresis, the voltage sometimes is not applied uniformly to the support medium and when resolving conditions are made locally uneven on the support medium and consequently the resolved rows obtained are distorted.

Furthermore, in the case radioactively labeled impurities such as natural radioactive materials are contained in the sample, that the support medium is contaminated with such radioactive impurities, or that the resolution conditions are not appropriate, a noise sometimes appears on the autoradiograph. In consequence, accurate analysis of the locational information on the radioactively labeled substances becomes difficult, resulting in decrease of accuracy of the desired information.

In the above-described cases, it is not easy to analyze the locational information on the radioactively labeled substances. Thus, even if the aforementioned additional detection device is used, it is still difficult to obtain satisfactorily accurate locational information on the radioactively labeled substances.

SUMMARY OF THE INVENTION

The present inventors have discovered that the information on the one dimensional location of radioactively labeled substances can be obtained in the form of symbol and/or numeral by signal processing method. Said signal processing comprises steps of obtaining digital image data signal corresponding to the autoradiograph visualized on a radiosensitive material, which has the locational information on the radioactively labeled substances in a sample, and subsequently processing the digital signal. This method is advantageously applicable to the determination of base sequence of DNA or DNA fragment to give operational easiness and high accuracy.

The present invention provides a data image processing method in autoradiography for obtaining information on one dimensional location of radioactively labeled substances distributed in at least one dimensional direction on a support medium in the form of symbols, numerals or a combination thereof, which comprises a process including:

(1) generating digital image data where the data comprises sets of digital signals corresponding to the autoradiograph including the row of distributed substances and where the sets of digital signals respectively represent successive linear portions of the autoradiograph;

(2) scanning selected digital signals of said digital image data to generate at least one further signal representative of a predetermined portion of said one row of distributed substances where the position of said predetermined portion is at least partially determined by its location in the scanning direction and the amount of said radioactively labeled substances at said location is at least partially determined by the amplitude of said further signal;

(3) processing said further signal through either or both of smoothing and threshold-processing to detect at least one sampling point corresponding to the location of said predetermined portion of said one row of distributed substances, said digital image data being obtained by (a) exposing a radiosensitive material to radiation emitted by said radioactively labeled substances on the support medium to record the autoradiograph of the radioactively labeled substances on the radiosensitive material, (b) reading out said autoradiograph photoelectrically and (c) converting the detected stimulated emission into said digital image data.

The present invention also provides a signal processing method in autoradiography, which comprises steps of:

scanning the digital image data in at least two different positions in such a manner that each scanning selects certain ones of said digital signals corresponding to the row of distributed substances to obtain relationships between positions of said certain ones of the digital signals in the direction of the scanning and the signal levels at said positions;

generating two distributed point signals based on said relationships where the two distributed point signals are generated for said row of distributed substances, the two distributed point signals respectively corresponding to the two different scanning positions and where said two distributed points are disposed on said row; and generating a signal corresponding to a continuous line selected from the group consisting of a straight line, a curved line and a polygonal line connecting said points on the row where said continuous line corresponds to a scanning line for detection of sampling points respectively corresponding to the locations of said substances, scanning said digital image data along said scanning line to obtain locational information signals representative of said locational information for each of said substances in said sample, in which said digital image data is obtained in the same manner as above.

BRIEF DESCRIPTION OF DRAWINGS

FIG. 12-(c) is a graph for the fifth row showing a relationship between position on the scanning line and level of digital signal in said position and obtained by subtraction between the graphs (a) and (b).

DETAILED DESCRIPTION OF THE INVENTION

Figure 1:
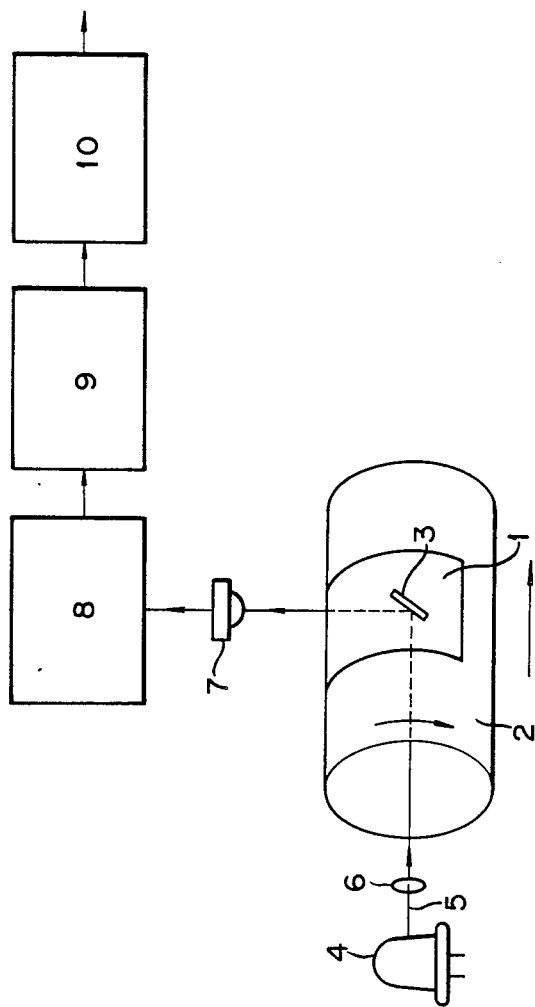
FIG. 1 shows an example of a read-out system for reading out an autoradiograph having locational information on the radioactively labeled substances in the sample recorded on a radiosensitive material employable in the present invention.

The present invention utilizes a method which comprises the steps of: placing a sample containing radioactively labeled substances and a radiosensitive material together in layers to record an autoradiograph of the sample on the radiosensitive material; reading out the autoradiograph photoelectrically to obtain electric signal; and converting the electric signal to digital signal through A/D conversion.

In the present invention, the term "locational information" of the radioactively labeled substances means to include a variety of information relating to the location of the radioactively labeled substances, or the aggregation thereof, being present in the sample, such as the location, the shape, the concentration, the distribution and combinations thereof.

According to the present invention, one dimensional distribution (resolution) direction can be detected automatically to determine a scanning line for detection of sampling points, even if there occurs overall distortion or dislocation in an autoradiograph recorded on the radiosensitive material which is brought about by locational distortion of a resolved row of the radioactively labeled substances on the support medium in the course of the resolution process, or by a locationally inaccurate arrangement between the support medium carrying the row of radioactively labeled substances thereon and the radiosensitive material in the course of the recording (i.e., exposing) procedure of the autoradiograph thereof. Based on the thus determined scanning line, the locational information on the row of the distributed radioactively labeled substances (referred to herein as "distributed row") can be obtained with high accuracy. Furthermore, when the autoradiograph is composed of a plurality of rows of radioactively labeled substances direction, the one dimensional distribution direction of every distorted row can be accurately detected to determine each scanning line for the row.

In the present invention, the term "distributed row" means a row which comprises radioactively labeled substances scattered or distributed in one direction in the form of bands or spots, such as an electrophoretic row obtained through electrophoresis. The term "digital image data" means sets of digital signals corresponding to the autoradiograph of the radioactively labeled substances.

Further, even if the autoradiograph of a sample contains noise, it is possible to easily remove only the noise from the autoradiograph so as to obtain proper image data, by subjecting the corresponding digital image data to the specific signal processing according to present invention. In more detail, the locational information of the sample can be obtained with high accuracy, being free from the adverse effect of noise which has been introduced by radioactively labeled impurities contained in the sample or improper resolution conditions. Moreover, if a reference row (internal reference row) is provided for the radioactively labeled substances under analysis, the detection of the location thereof can be further easily performed with high accuracy.

The reference row (internal reference row) in the present invention means, for instance, a resolved row composed of a mixture of four kinds of base specific cleavage products obtained by specifically cleaving DNA, to facilitate the determination of the base sequence of DNA or a DNA fragment. The reference row is employed as reference in signal processing for obtaining the locational information on the radioactively labeled substances in other resolved rows. The reference row does not necessarily consist of a resolved row, and can be synthesized from plural resolved rows as part of the signal processing.

Furthermore, the distributed (e.g., resolved) portions of the radioactively labeled substances, namely the sampling points are automatically detected on the digital image data, and it is possible to analyze the locations of distributed portions with high accuracy even if the size of each distributed portion thereof is reduced. This means that the absolute amount of the radioactively labeled substances used in one autoradiographic process can be reduced, or that the resolved rows formed on a single support medium can be increased in the number without broadening the width of a support medium, so that the amount of information obtainable in single autoradiographic process can be increased as compared with the case employing the conventional analysis.

Examples of samples employable in the present invention include a support medium on which radioactively labeled substances are distributed (e.g., resolved) in at least one one dimensional direction to form a distributed row (e.g., resolved row). Examples of the radioactively labeled substances include biopolymers, derivatives thereof, or cleavage products thereof, labeled with a radioactive element.

For instance, in the case that the radioactively labeled biopolymers are polymeric substances such as protein, nucleic acid, derivatives thereof and cleavage products of either the protein, the nucleic acid or their derivatives, the present invention is useful for isolation and identification thereof. Further, the present invention can be effectively used to analyze the whole or partial molecular structures of these biopolymers or basic segmental constitutions thereof.

Representative examples of the method for resolving (or developing) the radioactively labeled substaces on a support medium include electrophoresis using one of various resolving mediums such as a gel in the form of layer, column or the like, a molded polymer film such as a cellulose diacetate film, and a filter paper, and thin layer chromatography using a support material such as silica gel. However, the method employable in the present invention is by no means restricted to these methods.

Samples employable in the present invention are by no means restricted to the above-mentioned samples, and any other samples can be used, provided that the sample is a support medium containing the radioactively labeled substances distributed one-dimensionally thereon and the autoradiograph having the locational information of the substances can be recorded on the radiosensitive material.

The radiosensitive material used in the present invention has a basic structure comprising a support and a radiographic (photographic) emulsion layer. The radiographic emulsion layer comprises a binder such as gelatin and silver halide dispersed therein. For instance, the radiosensitive material is prepared by providing the above-mentioned emulsion layer onto the transparent support such as a polyethylene terephthalate sheet. A representative example of the radiosensitive material includes a radiographic film such as a highspeed type X-ray film.

In carrying out the exposing procedure, that is, the procedure of exposing the radiosensitive material to the radiation emitted from the support medium containing the radioactively labeled substances, at least a portion of the emitted radiation is absorbed in the radiosensitive substance of the radiosensitive material by placing the support medium and radiosensitive material together in layers for a certain period of time. The exposure can be accomplished by keeping the radiosensitive material in a position adjacent to the support medium, for instance, at a low temperature such as a temperature lower than 0° C. for at least several days, and then the radiosensitive material is developed. In the exposing procedure, it is further possible to enhance the radiographic speed of the radiosensitive material by using a radiographic intensifying screen or applying thereto a preliminary exposure such as flash exposure.

The exposing procedure of the radiosensitive material to a sample and the developing procedure thereof in the autoradiographic process have been well known, and are described for instance in the following literature: Method in Biochemical Experiment, Volume 6, Method in Tracer Experiment I, 271-289, "8. Autoradiography" by Toru Sueyoshi & Akiyo Shigematsu (Tokyo Kagaku Dozin Ltd., 1977).

A method for reading out or detecting the autoradiograph having the information on one dimensional location of the radioactively labeled substances in the sample recorded on the radiosensitive material according to the invention will be described briefly, referring to an embodiment of a read-out system shown in FIG. 1 of the accompanying drawings.

FIG. 1 schematically illustrates an embodiment of the read-out system for reading out the autoradiograph having one dimensional information on the location of the radioactively labeled substances, which is recorded in the form of a visual image on a radiosensitive material 1.

The radiosensitive material 1 on which the visual image is recorded is mounted on a transparent and hollow drum 2. The drum 2 is moved in the axial direction at a certain speed as well as rotated about its axis at a certai pitch and a mirror 3 is fixed in the hollow drum 2. A light beam 5 generated by a light source 4 passes through a lens 6 and impinges on the drum 2. The light beam is then reflected in the upper direction by the mirror 3 and passes through the radiosensitive material 1 mounted on the transparent drum 2. Thus, the radiosensitive material 1 is spot-scanned with the light beam in the X-Y scanning mode.

The light beam passing through each position of the radiosensitive material 1 is received by a light detector 7 and converted to an electrical signal. The electrical signal is amplified by an amplifier 8 and converted to a digital signal through an A/D converter 9.

A typical readout procedure is described in Japanese Patent Provisional Publications No. 54(1979)-121043.

The preferred embodiment of the read-out procedure utilizes light transmission, however, other optical scanning methods may be substituted. the light reflection method can be also applied thereto. Further, the read-out procedure is by no means restricted to the above-mentioned embodiment, but other various methods such as a read-out procedure using a TV camera can be utilized.

Thus obtained digital image data corresponding to the autoradiograph of the radioactively labeled substances is subsequently applied to the signal processing circuit 10 shown in FIG. 1. In the signal processing circuit 10, the scanning line is determined and then the sampling points are detected from the digital signal. The digital signal is provided with an address (X, Y) represented by a coordinate system fixed to the radiosensitive material. The digital signal further provides a signal level (Z) corresponding to the amount of the transmitted light.

The set of digital signals obtained by photoelectrically reading out the autoradiograph on the radiosensitive material, namely the digital image data, are stored temporarily in a memory device of the signal processing circuit 10 that is, stored in a non-volatile memory unit such as a buffer memory, a magnetic disk, etc.. In the signal processing, the scanning of the digital image data is to selectively pick up only the signal in the scanning area from the memory device.

Figure 2:
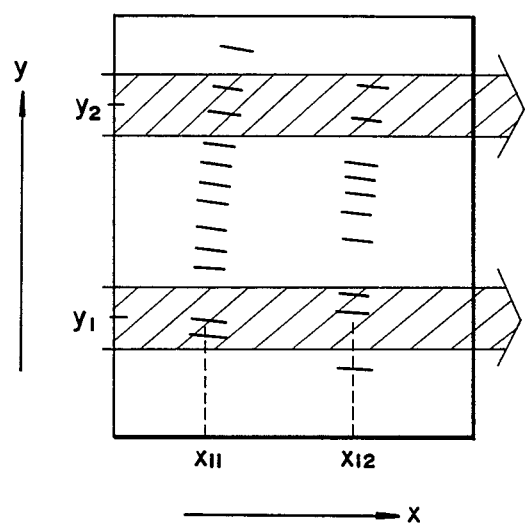
FIG. 2 shows an example of an autoradiograph of a sample in which radioactively labeled substances are resolved on a support medium, which is recorded on a radiosensitive material.

FIG. 2 shows an example of the autoradiograph of a sample recorded on the radiosensitive material, in which the autoradiograph is composed of a plurality of radioactively labeled substances resolved in the longitudinal direction of the support medium thereon to form two resolved rows. The autoradiograph on the radiosensitive material is distorted, as shown in FIG. 2, due to the inaccurate operation such as incorrect arrangement of the support medium and radiosensitive material in the course of the recording (exposing) process.

A set of digital signals (digital image data), obtained by applying the read-out procedure to the radiosensitive material carrying the autoradiograph thereon and received by the signal processing circuit 10, corresponds to the autoradiograph shown in FIG. 2.

In FIG. 2, when the vertical direction is referred to as a Y-axis direction and the horizontal direction is referred to as an X-axis direction in the radio-sensitive material. The scanning lines are determined by the following steps.

The digital image data is scanned numerically along the X-axis direction in such a manner that the scanning traverses the one dimensional distribution direction of the radioactively labeled substances. That is, the scanning traverses the distributed rows to establish a relationship between the position (X) on the scanning and the signal level (Z) at its position where the data is obtained obtained.

Figure 3A:
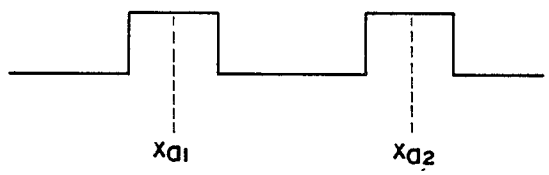
FIGS. 3-(a) and 3-(b) are graphs both showing relationships between position in the scanning and level of digital signal in said position.
Figure 3B:
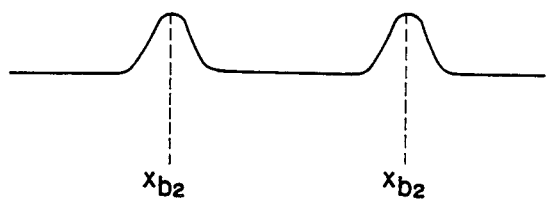

Upon plotting the position (X) on the scanning on the abscissa and the signal level (Z) on the ordinate, a graph such as shown in FIG. 3-(a) is given.

FIG. 3-(a) shows a graph obtained by the scanning on the digital image data corresponding to the autoradiograph shown in FIG. 2, where the radioactively labeled substances are resolved in the form of bands with a certain width.

In the graph of FIG. 3-(a), a middle point ($X_{am}$) in each region where the signal exhibits a maximum level is assigned to a distributed point of the radioactively labeled substances on each distributed row, wherein a is a positive integer and represents the scanning number (indicating the order of the scanning operation; in this case, a=1 or 2), and m is a positive integer and represents the number of distributed row. That is, the point $X_{am}$ means a distributed point of the radioactively labeled substances which is detected by the a scanning row and is present on the m distributed row.

The scanning is carried out at least twice in different positions on the digital image data, namely at different Y-coordinates. Subsequently, a graphical illustration such as shown in FIG. 3-(a) is produced for each scan, and two or more sets of distributed points of the radioactively labeled substances are determined on the graph.

$$\{(X_{a1}, X_{a2}), a=1, 2, \ldots\}$$

In the second place, a straight line (or polygonal line) which joins the distributed points with the same number m in series of a is prepared for each distributed row and to a scanning line for the detection of sampling points. Of course, a straight line or curved line connecting the distributed points may be assigned to the scanning line for detecting sampling points.

The two sets of distributed points of the radioactivley labeled substances (represented as below) are found by scanning twice the two Y-coordinates ($Y_1$ and $Y_2$) in parallel to the X-axis:

$$\{(X_{11}, X_{12}), (X_{21}, X_{22})\},$$

a straight line which joins two distributed points of ($X_{11}$, $Y_1$) and ($X_{21}$, $Y_2$) is assigned to the scanning line for the detection of sampling points for the first distributed row. The scanning line for the second distributed row is prepared as a straight line joining two distributed points of ($X_{12}$, $Y_1$) and ($X_{22}$, $Y_2$) in the same manner as mentioned above.

The scanning operation in the X-axis direction can be carried out in any position in the Y-axis. The scanning line for the detection of sampling points is determined by two scannings, namely finding two distributed points. The distance between the two scanning positions on Y-axis such that the scanning line to be determined should coincide with the real distributed row closely as possible. That is, the top end (or vicinity thereof) and bottom end (or vicinity thereof) of the resolved row of the radioactively labeled substances are desirably selected as the scanning positions. The scannings are not necessarily done in parallel to each other, but scannings in parallel is naturally preferred.

The above-mentioned scanning is required to be done with such a width as to coincide with at least one resolved portion (band or spot, etc.) of the radioactively labeled substances for each distributed row. The scanning is accomplished with the digital image data having a certain width and its scanning center along Y-axis direction. If the scanning width is excessively small, the scanning may not detect a resolved portion (i.e., portion in which the resolved radioactively labeled substance is present), but the detected the distributed points may include error if the distribution of the radioactively labeled substances on that portion deviates. If the scanning width is excessively wide, the detected distributed points of the radioactively labeled substances may be inaccurate. Accordingly, it is desirable that the scanning width be predetermined depending on the conditions of the sample.

The graph of the signal shown in FIG. 3-(a) is obtained, for instance, by picking up the digital signals within a certain scanning width and summing the levels thereof for each X-coordinate. The summed data may be further subjected to threshold processing so as to reduce noise. Otherwise, the graph is obtained by repeatedly picking up the digital signals within the scanning width, applying threshold processing to the signals for each Y-coordinate, and summing the applied signals for each X-coordinate. The Y-coordinate of the scanning is represented by a middle point of the scanning width.

The threshold processing mentioned herein means a two-valued (i.e., binary) processing, that is, the level of digital signal being equal to a certain level (the threshold value) or higher than said value is assigned to 1, while the level of digital signal which is lower than said value is assigned to 0, whereby representing all levels of digital signals by 1 or 0.

Otherwise, the above-mentioned scanning can be carried out as follows. The digital signal within the scanning width is picked up repeatedly for each Y-coordinate to find out the X-coordinate $X_{ai}$ at which the signal exhibits a maximum level for each Y-coordinate (using a graph such as shown in FIG. 3-(a)), and subsequently the local mean X-coordinate $X_{al}$ is calculated.

$$X_{al} = \sum_{i}^{N} X_{ai}/N$$

The Y-coordinate $Y_1$ is found by averaging Y-coordinates which provide $X_{ai}$ included within a certain precision range of $X_{al}$. Then, both coordinates are assigned to the above-mentioned distributed point $(X_{al}, Y_1)$.

The above-mentioned scanning position and scanning width may be manually applied to the signal processing circuit 10 for each sample prior to the signal processing of the digital signal. By predetermining the scanning position and scanning width independently for each sample as described above, the distributed points of the radioactively labeled substances can be detected accurately even if the distribution the one dimensional direction thereof varies greatly depending on the kind of a sample and the resolution conditions, etc.

Scanning more than twice increases the detected distributed points of the radioactively labeled substances. In this case, a straight line (polygonal line) obtained by joining the distributed points, which becomes the scanning line for the detection of sampling points, fits more closely to the distributed row thereof. Further, by processing the polygonal line with a suitable approximation to prepare a curved line, the scanning line for the detection of sampling points can be determined more accurately. However, this increase in the number of steps the scanning operation brings about complexity and increased processing time in the signal processing. It is preferable that the number of scans be determined depending on the conditions of the sample and the accuracy desired in the autoradiographic process.

For instance, in the autoradiography of the sample in which nucleic acids, derivatives or cleavage products of the nucleic acids or the derivatives, labeled with a radioactive element, are resolved on a support medium through a method using electrophoresis or the like, the scanning line for the detection of sampling points can be determined accurately with two scans. The scanning width is preferably so predetermined as to catch two or three distributed portions (resolved bands) of the radioactively labeled substances for each resolved row.

According to the above-described determination of the scanning line for the detection of sampling points, it is possible that the width of respective distributed portions of the radioactively labeled substances is reduced to approx. 3 mm. Therefore, the present invention permits reduction of the amount of the radioactively labeled substances needed for the preparation of resolved rows and consequently, makes it possible to increase the number of rows resolvable in a single support medium.

In a signal processing method of the present invention, the distributed point of the radioactively labeled substances in each scanning area can be more easily detected by utilizing a graph which is imaginarily obtained through the differentiation of the graph of FIG. 3-(a). That is, the signal of FIG. 3-(a) may be differentiated to facilitate detection of the distributed point for a particular distributed point included with one of the scans of FIG. 2. On more detail, edges of the resolved row can be emphasized by differentiating the signal and consequently the both edges in the width direction of the resolved row can be easily detected, the distributed point of the radioactively labeled substances being detected by simply finding the middle point between the both edges.

Figure 4A:
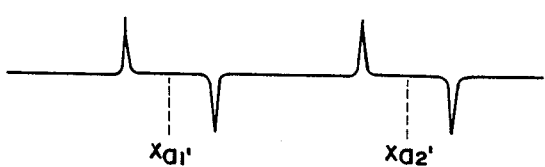
FIGS. 4-(a) and 4-(b) are graphs obtained by differentiating the graphs of FIGS. 3-(a) and 3-(b), respectively.
Figure 4B:
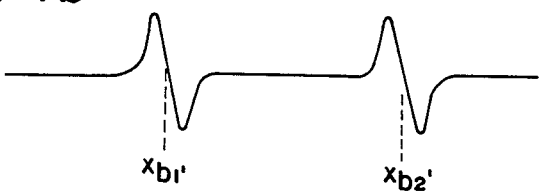

The signal of FIG. 4-(a) shows a graph which is obtained by differentiating the signal of FIG. 3-(a). From the signal of FIG. 4-(a), the edges of each resolved row can be easily detected and thus the distributed points of the radioactively labeled substances in each row are determined by determining each middle point $(X_{am}')$ between a positive peak of the differentiated signal and a negative peak thereof.

In the case where the radioactively labeled substances are resolved in the form of spots in which the resolved row is liable to exhibit remarkable dislocation of distortion, or in the case that the above-mentioned scanning conditions (scanning position and scanning width) are not suitably predetermined, a signal with position (X) on the scanning line and singla level (Z) is obtained as shown in FIG. 3-(b).

In the graph of FIG. 3-(b), each point ($X_{bn}$) at which the signal exhibits a maximum level is assigned to a distributed point of the radioactively labeled substances in each resolved row, wherein b is a positive integer and represents the scanning number, and n is a positive integer and represents the row number.

The signal of FIG. 4-(b) shows a graph which is obtained by differentiating the signal of FIG. 3-(b). From the graph of FIG. 4-(b), each middle point ($X_{bn}'$) where the differentiated level value changes from positive to negative can be assigned to a distributed point of the radioactively labeled substances in each resolved row.

In the above cases, the scanning line for the detection of sampling points can be also determined using the detected distributed points in the same manner as described above.

In examples shown in FIGS. 2 through 4, the processing is described for cases of the distributed pattern having two distributed rows, but the signal processing method for determining the scanning line of the present invention is by no means restricted to the case involving the just two rows, but the method can be applied to the distributed pattern of the radioactively labeled substances such as a pattern having only one row, or a pattern having plural (three or more) rows.

In the second step, the sampling points for detecting the distributed portions of the radioactively labeled substances are detected, for example, as described below referring to another example of the autoradiograph.

Figure 5:
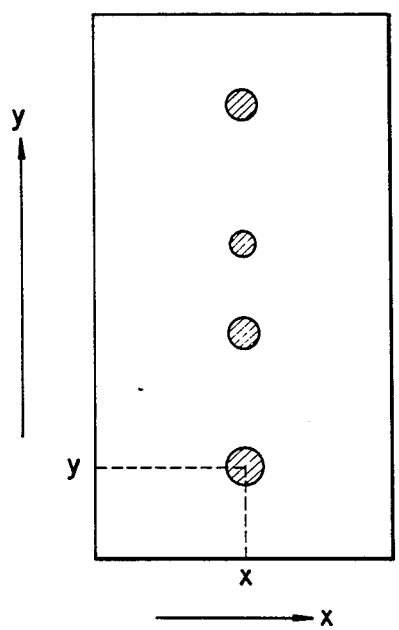
FIG. 5 shows an example of the autoradiograph of a sample in which radioactively labeled substances are resolved in one dimensional direction on a support medium and how digital image data representative of the autoradiograph is scanned at at least two different positions.

FIG. 5 shows an example of the autoradiograph of a sample in which radioactively labeled substances are distributed in one dimensional direction.

The digital signals corresponding to the autoradiograph of the sample are obtained in the manner described above. Concerning the digital signal, the scanning line for detecting the sampling points can be determined as described above, that is for example, by scanning the digital image data in two different positions in such a manner that the scanning traverses the one-dimensional resolved row of the radioacitively labeled substances; detecting two distributed points thereof on said scanning; and joining said two distributed points to give a straight line.

Figure 6:
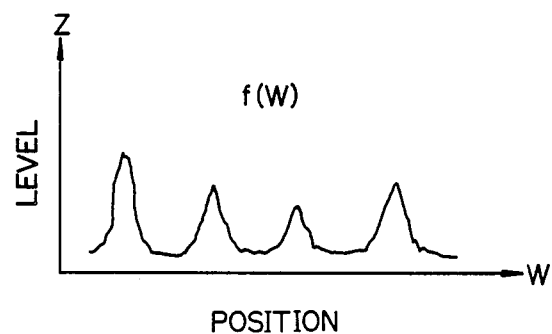
FIG. 6 shows an example of a graph indicating relationship between position in the scanning and level of the digital signals in said positions.

The scanning along the scanning line is performed on the digital image data. As a result, a signal is obtained in which the position (W) of each substance on the scanning line as abscissa and the signal level (Z) associated therewith is as ordinate is obtained as shown in the graph of FIG. 6. The scanning is done with a certain width. That is, the summation of the digital levels for each W-coordinate within the scanning width are plotted against the abscissa in the graph.

Figure 7:
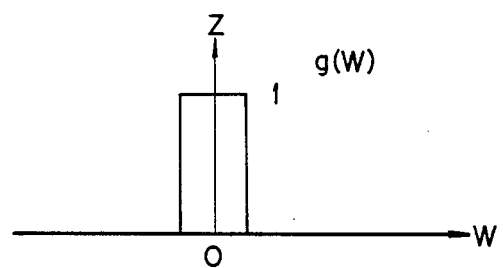
FIG. 7 shows an example of the filter function employable for smoothing.

Susequently, the signal is smoothed, for instance, by convolution of the signal graph using a suitable filter function. Representative examples of the filter function employable for the convolution include a function g(w) graphically shown in FIG. 7. When the signal shown in FIG. 6 is represented with a function f(W), the following smoothed function h(W) is obtained by the convolution operation with the above-mentioned filter function:

$$h(W) = g(W) * f(W)$$

wherein * is the convolution operator. Thus, a signal as shown in the graph of FIG. 8 is obtained.

Figure 8:
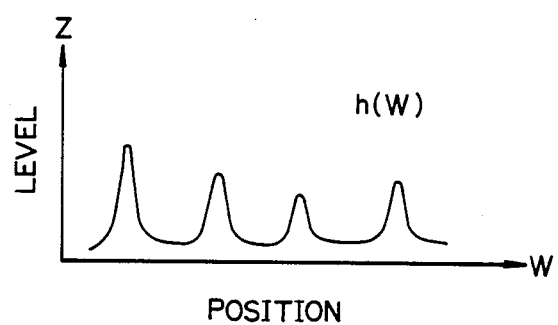
FIG. 8 is a graph obtained by processing the graph of FIG. 6 with the smoothing.

Further, the frequency of occurrence of the various levels of the signal of FIG. 8 may be determined to obtain a histogram that is, a histogram with respect to the digital signal on the above-mentioned scanning line with a certain scanning width. The histogram is preferably smoothed by convolution in the manner as described above.

Figure 9:
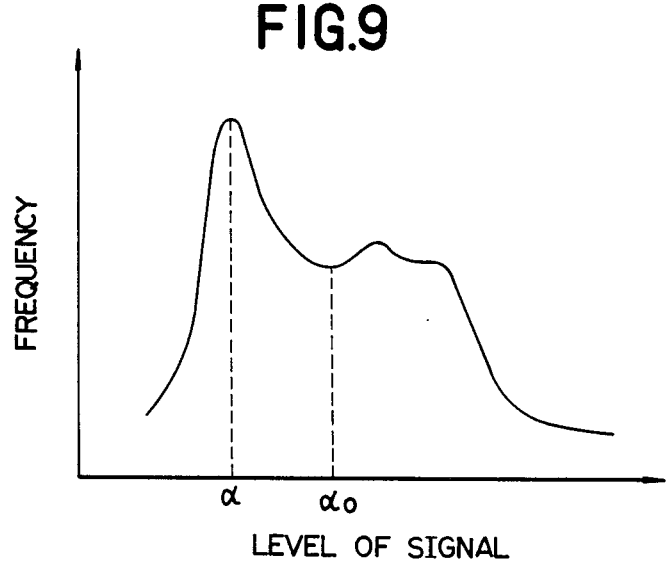
FIG. 9 shows a histogram corresponding to the graph shown in FIG. 6 and having been subjected to smoothing.

FIG. 9 shows a smoothed, histogram corresponding to the signal shown in FIG. 6. The peak point ($\alpha$) in the histogram of FIG. 6 represents the background level of the digital signal. A certain value is added to the signal level ($\alpha$) and the summed value ($\alpha_0$) is assigned to a threshold value.

The signal of FIG. 8 is subjected to threshold processing based on the obtained threshold value ($\alpha_0$). In more detail, a digital signal level which is equal to the threshold value or higher than said value is assigned to 1, while a signal level which is lower than said value is assigned to 0, so as to obtain a signal in which the signal level is represented by 1 or 0. In this signal, all middle points in regions in which the signal level equals 1 are assigned to sampling points.

In the signal processing method of the present invention, all maximum points shown in the smoothed graph of FIG. 8 can be assigned to the sampling points.

Thus, the sampling point $S_m$ having the positions ($W_m$) in the distributed direction of the radioactively labeled substances are determined, wherein m is a positive interger and represents the number of a sampling point. The information on the one dimensional location of the radioactively labeled substances is represented by the position ($W_m$) in the one dimensional direction by applying the signal processing to the digital signal as mentioned above.

Further, if the starting position for resolving the radioactively labeled substances is recorded on the radiosensitive material with a marker containing a radioactive element, the starting position ($W_0$) can be detected on the digital image data in the manner as described above. Otherwise, the starting position can be also detected mechanically by punching into the radiosensitive material a perforation and setting the starting position with respect thereto in the exposing procedure. Therefore, the locational information ($W_m$) can be represented by the migration distance ($W_m'$) from the starting position of resolution where $W_m' = W_m - W_0$.

Furthermore, when the signal level on each maximum point in the signal of FIG. 8 is assumed to correspond to the relative amount (concentration) of the radioactively labeled substances in each resolved portion, the one-dimensional information on the location of radioactively labeled substances may be represented by both the migration distance and relative amount ($W_m'$, $Z_m$). For the relative amount, various calculations such as integration in the vicinity of the each maximum point in the signal of FIG. 8 can be done.

The autoradiograph having the information on one dimensional location of the radioactively labeled substances is output from the signal processing circuit 10 in the form of numbers or symbols as mentioned above. The locational information, which is obtained as the coordinates of the sampling point $S_m$ and the signal level at those co-ordinates ($X_m$, $Y_m$, $Z_m$), are by no means limited to the above-mentioned representation modes, and other optional representation modes are also utilizable. Thus, the locational information on the radioactively labeled substances can be obtained in the form of symbols and/or numerals, as stated above.

The obtained symbol and/or numeral are transmitted to a recording device (not shown), directly or optionally via storage in a storing means such as a magnetic tape.

Various recording devices based on various systems can be employed for the above-described purpose, for instance, a device for visualizing optically by scanning a radiosensitive material with laser beam, etc., a display means for visualizing electrically on a CRT, etc., a means for printing a radiation image displayed on a CRT by mean of a video printer, and means for visualizing on heatsensitive recording material using thermic rays.

The present invention also provides a signal processing method in the autoradiography of the sample in which the groups of radioactively lableld substances are arranged in plural rows and distributed in a one dimensional direction in each row.

That is, a signal processing method in autoradiography for obtaining information on this one dimensional location of groups of radioactively labeled substances in a sample where the substances of the sample are arranged in plural rows including a reference row and distributed in at least one dimensional direction in each row on a support medium, in the form of symbols, numerals or combination thereof, which comprises a process including:

(1) generating digital image data where the data comprises sets of digital signals corresponding to the autoradiograph including the rows of distributed substances and where the sets of digital signals respectively represent successive linear portions of the autoradiograph;

(2) scanning selected digital signals of said digital image data to generate further signals representative of predetermined portions of the rows of distributed substances where the positions of said predetermined portions are at least partially determined by their location in the scanning direction and the amount of said radioactively labeled substances at said locations are at least partially determined by the amplitude of said further signals;

(3) processing said further signals with either or both of smoothing and threshold-processing to detect candidate sampling points corresponding to possible locations of certain ones of said substances in each of said rows;

(4) processing said candidate sampling points statistically to determine fundamental sampling points respectively corresponding to actual locations of said certain ones of said substances; and (5) detecting the remaining sampling points in each of said rows based on said fundamental sampling points to obtain said locational informational signals representative of said locational information for said substances in said sample;

(6) said to a digital image data being generated by (a) a radiosensitive material to radiation emitted by said groups of radioactively labeled substances on the support medium (b) to record the autoradiograph of the groups of radioactively labeled substances on the radiosensitive material, (c) reading out said autoradiograph photoelectrically and (d) converting the detected stimulated emission into said digital image data.

The reference row in the above-mentioned signal processing method is not necessarily provided on the support medium, but may be synthesized from the plural resolved rows as described before.

The sample used in the above-mentioned method generally comprises a support medium and groups of radioactively labeled substances, each group being distributed in a one dimensional direction in parallel to form a plurality of rows. The term "parallel" does not necessarily mean a strictly parallel relation in which the plural rows are completely parallel to each other, and includes locally parallel or approximately parallel relations.

In particular, the above-mentioned signal processing method in autoradiography is effectively applicable to analyze the molecular weight, molecular structure or basic unit constitution, of polymeric substances such as proteins, nucleic acids, and derivatives thereof or cleavage products of the protein or their derivatives and the nucleic acids or their derivatives.

Accordingly, the present invention provides a signal processing method in autoradiography for determination of base sequence of DNA or DNA fragments, employing at least four groups of the base specific cleavage products consisting of:

(1) guanine specific cleavage products;

(2) guanine specific cleavage products
+ adenine specific cleavage products;

(3) tymine specific cleavage products
+ cytosine specific cleavage products; and (4) cytosine specific cleavage products, which are obtained by specific cleavage of the DNA or DNA fragments which have been labeled with a radioactive element, and resolved respectively in one dimensional directions and in parallel relation to each other to form resolved rows on a support medium, which comprises a process including: generating digital image data where the data comprises sets of digital signals corresponding to the autoradiograph including the resolved rows and where the sets of digital signals respectively represent successive linear portion of the autoradiograph;

(1) synthesizing an internal reference row from the resolved rows;

(2) scanning selected digital signals of said initial image data to generate further signals representative of predetermined portions of said resolved rows where the positions of said predetermined portions are at least partially determined by their location in the scanning direction and the amount of said radioactively labelled cleavage product at said locations are at least partially determined by the amplitude of said further signals;

(3) processing said further signals with either or both of smoothing and threshold-processing to detect candidate sampling points corresponding to possible locations of certain ones of said cleavage products in each of said rows;

(4) processing said candidate sampling points statistically to determine fundamental sampling points respectively corresponding to actual locations of said certain ones of said cleavage products;

(5) detecting the remaining sampling points on each of the resolved rows based on said fundamental sampling points to obtain signals representative of the location of the remaining cleavage products in each of said resolved rows, and (6) comparing and identifying the positions of said sampling points in each of the resolved rows to obtain locational information on the guanine, adenine, thymine and cytosine, (7) said a digital image data cleavage products, said digital signal being obtained by being generated by (a) by said groups of radioactively labeled cleavage products on the support medium to record the autoradiograph of the groups of radioactively labeled cleavage products on the radiosensitive material, (b) and reading out said autoradiograph photoelectrically and (d) converting the detected stimulated emission into said digital image data.

In the signal processing method for determination of the sequence of DNA, it is also possible to provide the internal reference row on the support medium practically by simultaneously resolving the mixture of base specific cleavage products which is obtained by specifically cleaving DNA or DNA fragments at each of the four bases composing the constitutional unit thereof, in place of the process comprising synthesis of the internal reference row.

Anm embodiment of the signal processing in the autoradiography employing the signal processing method of the present invention will be described referring to an example of the process for determining the base sequence of DNA.

DNA is in the form of double helix structure consisting of two chain molecules and the two chain molecules are constituted by four constitutional base units, each unit having a base, namely adenine (A), guanine (G), thymine (T), or cytosine (C). The two chain molecules are cross-linked by hydrogen bonding between the four constitutional base units, and the hydrogen bonding between each base comprises only two combinations, namely G-C and A-T. Therefore, if the base sequence of one chain molecule is determined, that of the other chain molecule is naturally determined.

As a representative method for determining the base sequence of DNA utilizing autoradiography, the Maxam-Gilbert method has been known. In this method, a group containing a radioactive isotope of phosphorus (P) is attached to a chain molecule of DNA or a DNA fragment at one end to prepare a radioactively labeled substance, and then the radioactively labeled DNA molecule is specifically cleaved at the constitutional base units by certain chemical reactions. These reactions are called "base specific cleavage reactions". Then the obtained mixture of numerous cleavage products of the DNA or DNA fragment is resolved through gel electrophoresis to give a resolved pattern of the numerous cleavage products (the pattern is not visible).

In the procedure, an X-ray film is exposed to the resolved pattern and then developed to obtain a visualized autoradiograph thereon, and the sequential position of each base from the radioisotopically labeled end of the chain molecules is read by referring to the obtained autoradiograph and the applied base specific chemical reactions so as to determine the sequence of all bases in the under investigation substance.

The image data processing method for the determination of base sequence of DNA or its derivative, fragment, etc., will be described by an embodiment utilizing the above-mentioned Maxam-Gilbert method, referring to the case of employing the following four groups of base specific cleavage products as a typical combination of base specific cleavage product groups:

(1) guanine (G) specific cleavage products,
(2) guanine (G) specific cleavage products
+ adenine (A) specific cleavage products,
(3) thymine (T) specific cleavage products
+ cytosine (C) specifically cleaved product,
(4) cytosine (C) specific cleavage products.

The groups of the above-mentioned base specific cleavage products labeled with $^{32}P$ are resolved (developed) on a gel support medium through electrophoresis in the conventional manner, to obtain a sample. Then, the sample (support medium) is placed on a radiosensitive material together in layers at a low temperature ranging from −70° C. to −90° C. for several days to perform the exposure, and the autoradiograph of the sample is recorded on the radiosensitive material as a visual image.

Figure 10:
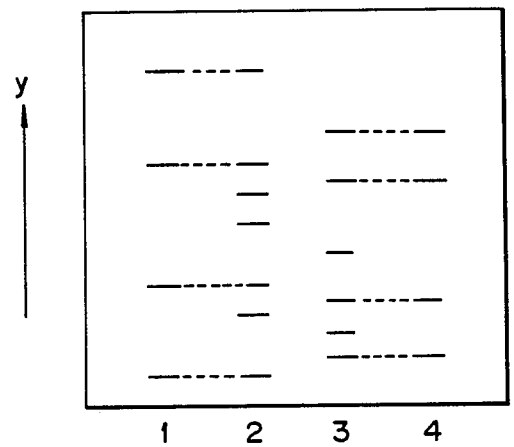
FIG. 10 shows an example of an autoradiograph of a sample in which base specific cleavage products of DNA are resolved on a gel support medium.

FIG. 10 shows an autoradiograph of resolved rows (electrophretic rows) comprising the above-mentioned four groups of radioactively labeled base specific cleavage products formed through resolution. That is, the first to fourth rows shown in FIG. 10 correspond to in order, (1)— (G) specific cleavage products,
(2)— (G) specific cleavage products
+ (A) specific cleavage products,
(3)— (T) specific cleavage products
+ (C) specific cleavage products,
(4) − (C) specific cleavage products.

The radiosensitive material carrying the above autoradiograph of the sample thereon is installed in the read-out system and subjected to the read-out procedure, to obtain the digital signal corresponding to the autoradiograph.

The obtained digital signal is subjected to the digital signal processing in the signal processing circuit 10 as mentioned above.

In the first place, the scanning line for signal processing is determined on each row shown in the autoradiograph of FIG. 10 in the same manner as mentioned above.

In the second place, the scanning with the scanning line is performed on the digital image data, so that a signal is generated in which the position (W) on the scanning line is plotted as abscissa and the signal level (Z) as ordinate with respect to each row. The position on the scanning line is preferably represented by the electrophoretic distance between that position and the starting position ($W_{k0}$) of the electrophoresis with respect to each row, wherein k is a positive integer and represents the row number. The starting position is detectable by employing a marker.

The signals which exhibit the higher level (Z) at each corresponding position (W) on the scanning line in comparison between the signals representing the second row and third row, are selectively picked up and combined to obtain a further signal which includes signals concerning all four kinds of base specific cleavage products, i.e., (G) specific cleavage products, (A) specific cleavage products, (T) specific cleavage products and (C) specific cleavage products. The farther signal corresponds to an internal reference row (referred to herein as the zeroth row).

In place of carrying out the above-described procedure, an electrophoretic row containing the above-mentioned four kinds of base specific cleavage products of DNA can be practically formed simultaneously with others on the support medium, so that said electrophoretic row may be the internal reference row.

The internal reference row is then subjected to smoothing and/or threshold-processing in the same manner as mentioned hereinbefore to obtain candidate sampling points $S_{0n}$ each having an electrophoretic distance ($W_{0n}$), wherein 0 represents the internal reference row, and n is a positive integer and represents the number of sampling points corresponding to the candidate point.

Subsequently the obtained candidate sampling point $S_{0n}$ are subjected to statistical processing to determine whether each candidate point is a fundamental sampling point. It is reasonably assumed that if a radioactively labeled substance present at a certain candidate sampling point ($S_{0n}$) on the internal reference row is a certain cleavage product, a radioactively labeled substance present at a candidate sampling point ($S_{0n+1}$) (i.e., a candidate sampling point located in the position adjacently subsequent to the candidate sampling point ($S_{0n}$)) is a cleavage product in which one of four bases is attached to units corresponding to the cleavage product present at the point $S_{0n}$. Moreover, it is experimentally known that the migration distance of each radioactively labeled substance and the logarithm of the molecular weights thereof are in a linear relation. Therefore, the candidate sampling points can be processed statistically by approximating with the following functional equation:

$$W_{0n} = a - b \log (A + M_n) \quad (1)$$

wherein a and b are experimental values determined according to the applied electrophoretic conditions, and A and M are values relating to the molecular weight of the base specific cleavage products of DNA.

By introducing a value representing the migration distance $W_{0n}$ of each candidate sampling point $S_{0n}$ and the number n of the sampling point corresponding to said candidate sampling point into the equation (1), the most probable values $a_0$ and $b_0$ are calculated. Then, $a_0$ and $b_0$ are introduced into the equation (1), to determine the fundamental sampling point $S_{0n}'$ represented by the most probable migration distance ($W_{0n}'$).

Next, based on the thus determined fundamental sampling point $S_{0n}'$, the number of the digital signals which exist within a certain area having as a center the position on the scanning line corresponding to the fundamental sampling point and exhibiting a level not lower than the aforementioned threshold value is obtained through calculation for each fundamental sampling point with respect to each of the four rows. Upon comparison of thus obtained number of digital signals each row, where a suitable threshold-processing is performed repeatedly if desired, the desired sampling points are detected in each row.

According to the above-mentioned processing, each row is represented by the set $\{S_{0n}'\}_k$ of the fundamental sampling point $S_{0n}'$ having the most probable migration distance ($W_{0n}'$). The fundamental sampling points detected in each row are assigned to the desired sampling points.

Figure 11:
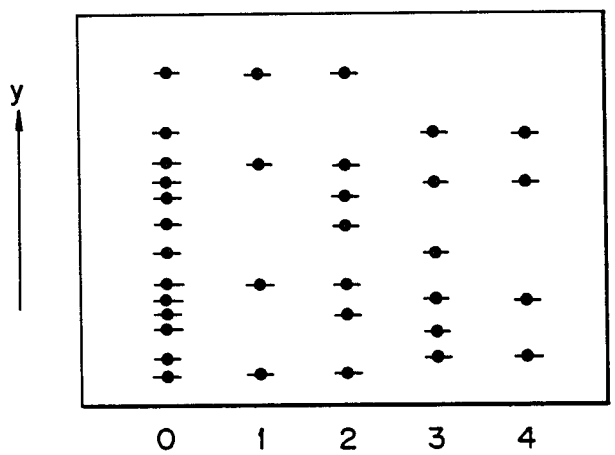
FIG. 11 shows an illustrative scheme indicating the sampling points detected in the resolved rows for the DNA of FIG. 10 by applying thereto the signal processing method of the present invention.

FIG. 11 shows the sampling points in each row in order:
 (0) — (G) specific cleavage products
 + (A) specific cleavage products
 + (T) specific cleavage products
 + (C) specific cleavage products;
 (1) — (G) specific cleavage products;
 (2) — (G) specific cleavage products
 + (A) specific cleavage products;
 (3) — (T) specific cleavage products
 + (C) specific cleavage products; and (4) — (C) specific cleavage products.

The first row to fourth row are then compared. In more detail, through an operation between the first row having the set of the sampling points $\{S_{0n}'\}_1$ and the second row having the set of the sampling points $\{S_{0n}'\}_2$ (namely, logical products operation), $$\{S_{0n}'\}_1 \cap \{S_{0n}'\}_2 = \{S_{0n}'\}_5$$

an imaginary fifth row having the set of the sampling points $\{S_{0n}'\}_5$ is prepared. The thus prepared fifth row has the locational information on adenine alone. The same operation is performed between the third row having the set of the sampling point $\{S_{0n}'\}_3$ and the forth row having the set of the sampling point $\{S_{0n}'\}_4$ to obtain an imaginary sixth row having another different set of the sampling points $\{S_{0n}'\}_6$. The sixth row prepared as mentioned above has the locational information on thymine alone.

By the above-mentioned processing, the information on the one dimensional location of the following four rows is newly obtained:
 (1) — (G) specific cleavage products,
 (5) — (A) specific cleavage products,
 (6) — (T) specific cleavage products,
 (4) — (C) specific cleavage products.

Otherwise, the detection of the sampling points for each row of different base specific cleavage products can be also performed according to the present invention as described below.

After obtaining the signal in which the position is plotted as abscissa and the signal level is plotted as ordinate as in FIG. 8, for example, the signal being represented by the function $f_k(W)$ concerning each of the resolved rows (1) through (4), wherein k is a positive integer and represents the row number, the following numerical operation (subtraction) is performed between the function $f_1(W)$ of the first row and the function $f_2(W)$ of the second row;

$$f_2(W) - f_1(W) = f_5(W)$$

to obtain an imaginary fifth row represented with $f_5(W)$. The fifth row correspnds to an imaginary row consisting essentially of only adenine specific cleavage products.

Figure 12A:
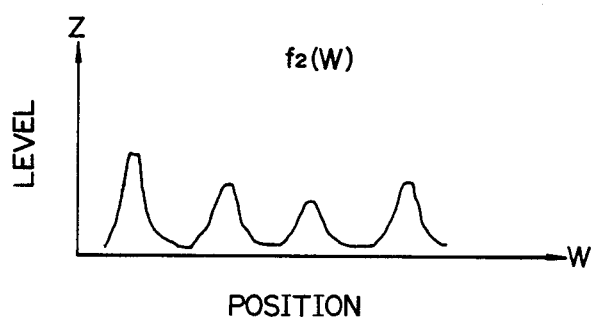
FIGS. 12-(a) and 12-(b) are graphs both showing relationships between position on the scanning line and level of digital signal in said position with respect to the second row and the first row, respectively.
Figure 12B:
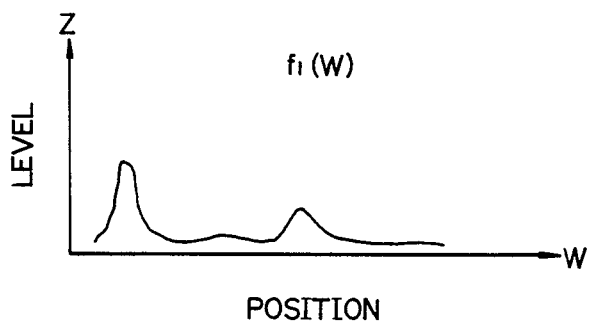
Figure 12C:
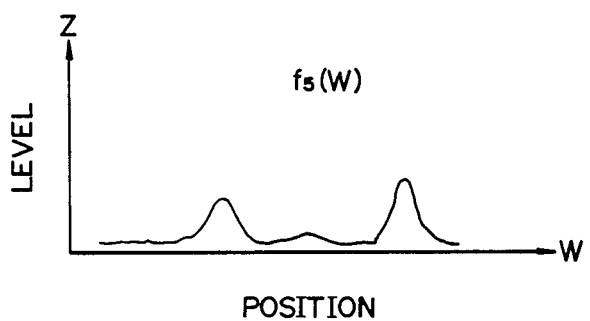
Figure 13A:
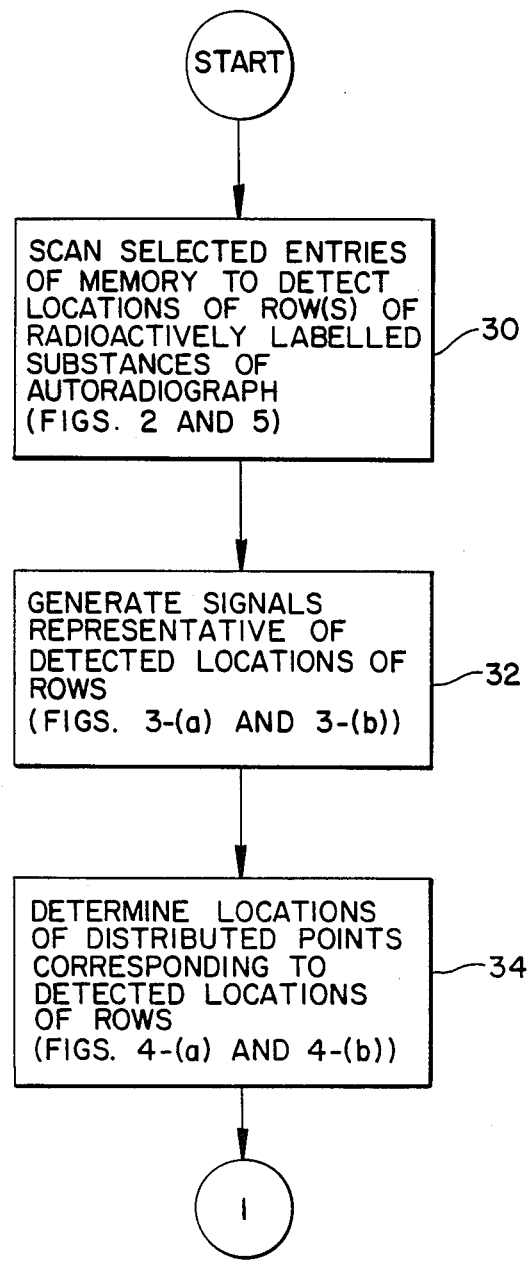
Figure 13B:
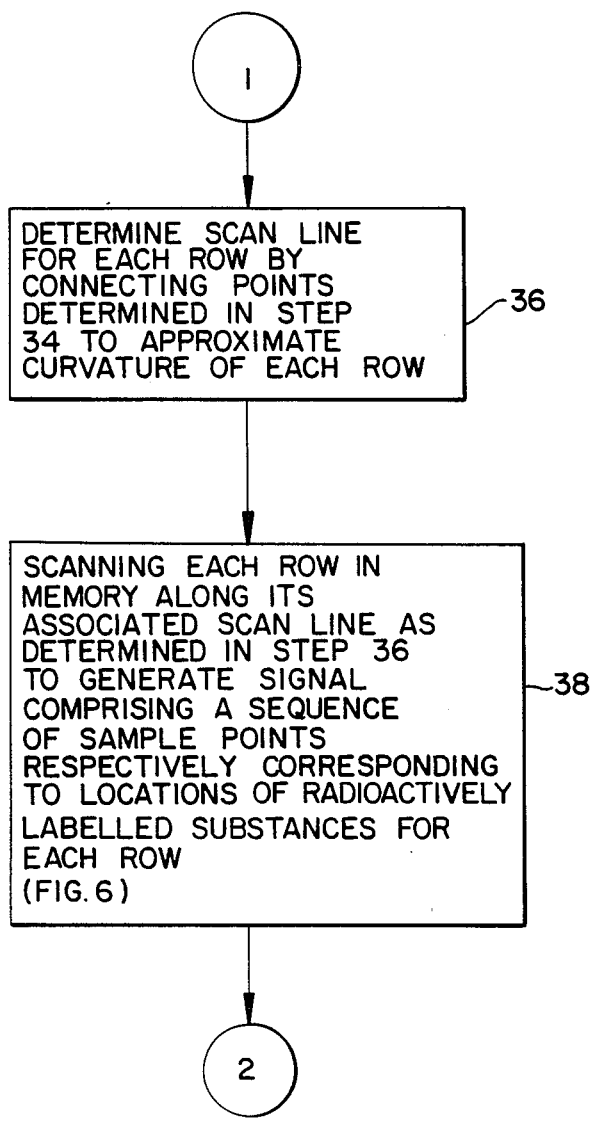
Figure 13C:
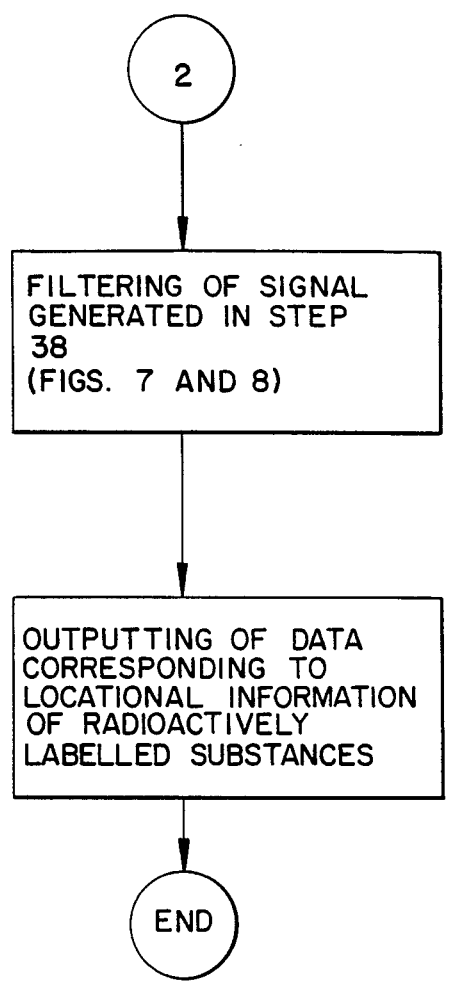

FIG. 12 graphically shows the above operation. That is, the graphs (a), (b) and (c) of FIG. 12 correspond to the second, first and fifth rows, respectively.

When the signal level is different between the resolved rows to be operated numerically, the signal is preferred to have similar levels, for instance, by adjusting the signal level in proportion to the density of the image for each resolved row according to the obtained digital image data.

The same subtraction is performed between the third row and the forth row to obtain an imaginary sixth row which is represented by $f_6(W)$ and corresponds to thymine specific cleavage products alone. Thus, the following four rows (including the calculated rows) consisting essentially of different kinds of respective base specific cleavage products, not of mixtures thereof are obtained:
 (1)-(G) specific cleavage products,
 (5)-(A) specific cleavage products,
 (6)-(T) specific cleavage products,
 (4)-(C) specific cleavage products.

As described above, the present invention also provides a signal processing method in autoradiography for determining the base sequence of DNA or a DNA fragment, employing at least two groups of base specific cleavage products or mixtures thereof comprising:

(1) single base specific cleavage products or a mixture of two or three kinds of base specific cleavage products selected from the group consisting of guanine specific cleavage products, adenine specific cleavage products, thymine specific cleavage products and cytosine specific cleavage products; and (2) a mixture of two, three or four kinds of base specific cleavage products containing at least one kind of the base specific cleavage products included in the above group 1), which are obtained by specific cleavage of the DNA or a DNA fragment which has been labeled with a radiactive element, and resolved respectively in one dimensional directions and in parallel relation to each other to form resolved rows on a support medium, which comprises a process including:

(1) operating numerically between the resolved row of the above group (1) and the resolved row of the above group (2) with respect to the corresponding positions on each scanning line to obtain a calculated resolved row;

(2) determining sampling points with respect to said calculated resolved row; said process being applied to a digital signals corresponding to an autoradiograph having the locational information on the groupsof radioactively labeled cleavage products, said digital signal being obtained by exposing a radiosensitive material to radiation emitted by said groups of radioactively labeled cleavage products on the support medium to record the autoradiograph of the groups of radioactively labeled cleavage products on the radiosensitive material, and reading out said autoradiograph photoelectrically.

The sampling points can be efficiently detected by comparing the digital signals among the above four rows based on the fundamental sampling point $S_{On}'$ in a synthesized internal reference row which is represented by the set $\{S_{On}'\}_k$ of the fundamental sampling point $S_{On}'$ having the most probable migration distance ($W_{On}'$). It is also possible to detect the sampling points not by using the fundamental sampling points, but by processing each function $f_k(W)$ corresponding to the above four rows with the smoothing through convolution and subsequently with threshold-processing as described hereinbefore.

Therefore, the fundamental sampling point $S_{On}'$ is replaced as follows:

(i) the sampling points which belong to $\{S_{On}'\}_1$ is replaced with G;

(ii) the sampling points which belong to $\{S_{On}'\}_4$ is replaced with C;

(iii) the sampling points which belong to $\{S_{On}'\}_5$ is replaced with A;

(iv) the sampling points which belong to $\{S_{On}'\}_6$ is replaced with T, and subsequently arranged in order of the sampling number n to obtain the following arrangement.

G—C—G—C—A—A—T—G—C—...

Thus, the base sequence of one chain molecule of DNA can be determined.

According to the signal processing method of the present invention, the base sequence of DNA can be also determined using the following most simple combination if base specific cleavage products:

(1)-(G) specific cleavage products,
(2)-(A) specific cleavage products,
(3)-(T) specific cleavage products,
(4)-(C) specific cleavage products, The above four groups are that combination where each is exclusive from each other. Accordingly, by utilizing the exclusiveness that there absolutely exists only one group of base specific cleavage products in the vertical direction of the resolved rows of the above four groups, the locational relation of the bases can be determined by reasonable judgement of the obtained digital signal on a basis of decision by majority. It suggests that the sequence of DNA according to the present invention could be determined more exactly than by the conventional visual judgement.

In more detail, concerning the digital signals corresponding to the autoradiograph of the resolved pattern comprising the four resolved rows of the above groups of base specific cleavage products, which is obtained by photoelectrically reading out the autoradiograph recorded on the radiosensitive material, the scanning lines for detecting the sampling points are determined, as well as the internal reference row is obtained by synthesizing the four resolved rows, and the fundamental sampling points in the internal reference row are determined, as described above. The internal reference row, as mentioned hereinbefore, may be practically provided of the support medium in place of synthesis on the digital image data.

Then, based on the determined fundamental sampling point $S_{On}'$ having the most probable migration distance ($W_{On}'$), the number of the digital signals which exist within a certain area having as a center the position on each scanning line corresponding to the fundamental sampling point and exhibiting a level not lower than the threshold value is calcuated for each fundamental sampling point on the respective four rows. That is, a certain area (sampling mask) with the center at the position ($W_{On}'$) is occurring for each fundamental sampling point $S_{On}'$ and a numbeer of signals existing within each sampling mask fixed on each scanning line and having the level higher than the threshold value is calculated.

Since the groups of base specific cleavage products contained in the above four resolved rows respectively are exclusive of each other, the number of the fundamental sampling points is necessarily equal to the sum of sampling points to be detected in the four rows. This means that one sampling point corresponding to one fundamental sampling point is detected in any one of the four rows. That is, the aimed sampling point for the same sampling mask must be detected only in one of the four rows.

Accordingly, by utilizing the above-mentioned exclusiveness among the rows, a row which exhibits the highest estimated value for the signal level with respect to the sampling masks of the same fundamental sampling point is selected, so as to decide that the sampling point corresponding to said fundamental sampling point is present in said row and absent in the other three rows. The estimated value for the signal level means an integral value of the signal levels included in the mask, or the number of signals whose level exceeds the threshold value in case of performing the threshold-processing. Thus, the sampling points for all the sampling masks are detected in any one of the four electrophoretic rows, respectively, namely, the sampling points corresponding to the fundamental sampling points in the internal reference row are detected in any one of the four rows.

According to the above-mentioned processing, each row is represented by the set $\{S_{On'}\}_k$ of the fundamental sampling point $S_{On'}$, wherein k represents the row number. The fundamental sampling point $S_{On'}$ is replaced with any one of the symbol G, A, T, C based on the row number k, and subsequently arranged in order of the sampling number n to obtain the base sequence of one chain molecule of DNA represented by the following arrangement:

G—C—G—C—A—A—T—G—C— ...

The representation mode of the information on the base sequence of DNA obtained as described hereinbefore is by no means limited to the above-mentioned representation mode, and other representation modes is optionally employable. For instance, the relative amount of resolved base specific cleavage products can be also obtained for representation by processing the signal level on the scanning line with an optional operation, if desired.

Further, the base sequence of both chain molecules of DNA can be represented. That is, by giving the information on the combinaton between the four bases, namely A—T and G—C, the sequence of DNA is represented by the following scheme.

G—C—G—C—A—A—T—G—C— ...

C—G—C—G—T—T—A—C—G— ...

The method for determining the base sequence of DNA utilizing the aforementioned combinatons of (G, G+A, T+C, C) and (G, A, T, C) is one example of the determination of the base sequence of DNA, and the signal processing of the present invention by no means limited to the above combinations, but various combinations are employable. The combination of at least one group of base specific cleavage products and a suitable reference substance (for example, a mixture of all base specific cleavage products) is employable to determine the sequence of the specific base.

In the above-mentioned examples the present invention was described by using four rows of the radioactively labeled substances resolved one-dimensionally on the support medium, but the number of resolved rows is by no means limited to four, and may be more or less than four. Further, according to the present invention, the base sequence of two or more DNA molecules can be determined simultaneously using a single support medium.

The information on the base sequence of DNA determined by the above-mentioned signal processing is output from the signal processing circuit 10, and can be subsequently recorded using the aforementioned recording devices or the like.

It is further possible to perform genetic philological information processing such as a comparison between the obtained base sequence of the DNA and the base sequence of another DNA which has been already recorded and stored in a suitable place.

What is claimed is:

1. A signal processing method for processing an autoradiograph recorded on a support medium and containing locational information on the one dimensional location of radioactively labeled substances in a sample where the substances are distributed in at least one one dimensional direction on said support medium to form at least one row of the distributed substances, which comprises the steps of:
   (1) generating digital image data where the data comprises sets of digital signals corresponding to the autoradiograph including the row of distributed substances;
   (2) scanning said digital image data in at least two different positions in such a manner that each scanning selects certain ones of said digital signals corresponding to the row of distributed substances to obtain relationships between positions of said certain ones of the digital signals in the directiion of the scanning and the signal levels at said positions;
   (3) generating at least two distributed point signals based on said relationships where the two distributed point signals are generated for said row of distributed substances, the two distributed point signals respectively corresponding to the two different scanning positions and where said two distributed points are disposed on said row;
   (4) generating a signal corresponding to a continuous line selected from the group consisting of a straight line, a curved line and a polygonal line connecting said points on the row where said continuous line corresponds to a scanning line for detection of sampling points respectively corresponding to the locations of said substances;
   (5) scanning said digital image data along said scanning line to obtain locational information signals representative of said locational information for each of said substances in said sample;
   (6) said digital image data being generated by (a) exposing a radiosensitive material to radiation emitted by said radioactively labeled substances on the support medium to record the autoradiograph of the radioactively labeled substances on the radiosensitive material, and (b) reading out said autoradiograph photoelectrically to obtain said image data; and
   whereby said locational information signals can be obtained irrespective of one or more deviations of said row of said distributed substances from a straight line due to the compensation effected by said scanning line for said deviations where said deviations may be present in the support medium and/or the radiosensitive material.

2. The signal processing method in autoradiography as claimed in claim 1, wherein the scanning of the digital image data in at least two different positions is carried out in parallel.

3. The signal processing method in autoradiography as claimed in claim 1 or 2, wherein the width of said scanning of the digital image data is set prior to the signal processing where the number of said selected certain ones of the digital signals is so chosen as to be at least equal to the number of digital signals corresponding to one of said radioactively labeled substances to thus set the width of the scanning.

4. The signal processing method in autoradiography as claimed in claim 1 or 2, where said continuous line is a straight line.

5. The signal processing method in autoradiography as claimed in claim 1 or 2, wherein said radioactively labeled substances arranged to form a row of distributed substances on the support medium are biopolymers, derivatives thereof, or cleavage products of either said biopolymers or said derivatives thereof, labeled with a radioactive element and resolved in said one dimensional direction on the support medium.

6. The signal processing method in autoradiography as claimed in claim 5, wherein said biopolymers are nucleic acids, derivatives thereof or cleavage products of either said nucleic or said derivatives thereof.

7. A signal processing method for processing an autoradiograph recorded on a support medium and containing locational information on the one dimensional location of radioactively labeled substances in a sample where the substances are distributed in at least the one dimensional direction on said support medium to form at least one row of the distributed substances, and locational informational signals in the form of symbols, numerals, or a combination thereof are obtained regarding said locational information, which comprises a process including:
(1) generating digital image data where the data comprises sets of digital signals corresponding to the autoradiograph including the row of distributed substances;
(2) scanning selected digital signals of said digital image data to generate at least one further signal representative of a predetermined portion of said one row of distributed substances where the position of said portion is at least partially determined by its location in the scanning direction and the amount of said radioactively labeled substance at said location is at least partially determined by the amplitude of said further signal;
(3) processing said further signal to detect at least one sampling point correspond to the location of said predetermined portion of said one row of distributed substances;
(4) processing said digital image data, in response to said processed further signal, to obtain at least one of said locational informational signals representative of said locational information for at least one of said substances in said sample;
(5) said digital image data being generated by (a) exposing a radiosensitive materiall to radiation emitted by said radioactively labeled substances on the support medium to record the autoradiograph of the radioactively labeled substances on the radiosensitive material, and (b) reading out said autoradiograph photoelectrically to obtain said digital image data; and
whereby said locational information signals can be obtained irrespective of one or more deviations of said row of said distributed substances from a straight line due to the compensation effected by said scanning line for said deviations where said deviations may be present in the support medium and/or the radiosensitive material.

8. The signal processing method in autoradiography as claimed in claim 7, wherein said smoothing is performed by convolution of the further signal with a filter function.

9. The signal processing method in autoradiography as claimed in claim 7 or 8, wherein the location of the maximum value of the smoothed, further signal corresponds to said sampling point.

10. The signal processing method in autoradiography as claimed in claim 7 or 8, wherein the middle point of said processed, further signal corresponds to said sampling point.

11. The signal processing method in autoradiography as claimed in claim 10, wherein the threshold value for said threshold-processing is determined based on a histogram.

12. The signal processing method in autoradiography as claimed in claim 7 or 8, wherein said radioactively labeled substances distributed on the support medium are biopolymers, derivatives thereof, or cleavage products of either said biopolymers or said derivatives thereof, labeled with a radioactive element.

13. A signal processing method for processing an autoradiograph recorded on a support medium and containing locational information on the one dimensional location of groups of radioactively labeled substances in a sample where the substances are arranged in plural rows including a reference row where each row is distributed in at least one one dimensional direction on said support medium, and locational information signals in the form of symbols, numerals, or a combination thereof are obtained regarding said locational information, which comprises a process including:
(1) generating digital image data where the data comprises sets of digital signals corresponding to the autoradiograph including the rows of distributed substances;
(2) scanning selected digital signals of said digital image data to generate further signals representative of predetermined portions of said rows of distributed substances where the positions of said portions are at least partially determined by their location in the scanning direction and the amounts of said radioactivity labeled substances at said locations are at least partially determined by the amplitudes of said further signals;
(3) processing said further signals to detect candidate sampling points corresponding to possible locations of certain ones of said substances in each of said rows;
(4) processing said candidate sampling points statistically to determine fundamental sampling points respectively corresponding to actual locations of said certain ones of said substances;
(5) detecting the remaining sampling points in each of said rows based on said fundamental sampling points to obtain said locational information signals representative of said location information for the remaining ones of said substances in each of said rows in said sample; and
(6) said digital image data being generated by (a) exposing a radiosensitive material to radiation emitted by said groups of radioactively labeled substances on the support medium to record the autoradiograph of the groups of radioactively labeled substances on the radiosensitive material, and (b) to obtain said digital image data;
whereby said locational information signals can be obtained irrespective of one or more deviations of said row of said distributed substances from a straight line due to the compensation effected by said scanning line for said deviations where said deviations may be present in the support medium and/or the radiosensitive material.

14. The signal processing method in autoradiography as claimed in claim 13, wherein said radioactively labeled substances distributed on the support medium are biopolymers, derivatives thereof, or cleavage products of either said biopolymers or said derivatives thereof, labeled with a radioactive element.

15. The signal processing method in autoradiography as claimed in claim 14, wherein said biopolymers are nucleic acids, derivatives thereof or cleavage of either said nucleic acids or derivatives products thereof; and said symbols, numerals, or a combination thereof; obtained by said signal processing method represents a base sequence of said biopolymers.

16. A signal processing method for processing an autoradiograph recorded on a support medium and containing locational information on the one dimensional location of groups of radioactively labeled substances in a sample where the substances are arranged in plural rows where each row is distributed in at least one one dimensional direction on said support medium, and locational information signals in the form of symbols, numerals, or a combination thereof are obtained regarding said locational information,
which comprises a process including:
(1) generating digital image data where the data comprises sets of digital signals corresponding to the autoradiograph including the rows of distributed substances;
(2) synthesizing a reference row from said plural rows of distributed substances,
(3) scanning selected digital signals of said digital image data to generate further signals representative of predetermined portions of said rows of distributed substances where the positions of said portions are at least partially determined by their locations in the scanning direction and the amounts of said radioactively labeled substances at said locations are at least partially determined by the amplitude of said further signals;
(4) processing said further signals to detect candidate sampling points corresponding to possible locations of certain ones of said substances in each of said rows;
(5) processing said candidate sampling points statistically to determine fundamental sampling points respectively corresponding to actual locations of said certain ones of said substances; and
(6) detecting the remaining sampling points in each of said rows based on said fundamental sampling points to obtain said locational informational signals representative of said locational information for the remaining ones of said substances in each of said rows in said sample;
said digital image data being generated by (a) exposing a radiosensitive material to radiation emitted by said groups of radioactively labeled substances on the support medium to record the autoradiograph of the groups of radioactively labeled substances on the radiosensitive material, and (b) reading out said autoradiograph photoelectrically to obtain said digital image data.

17. The signal processing method in autoradiography as claimed in claim 16, wherein said radioactively labeled substances distributed on the support medium are biopolymers, derivatives thereof, or cleavage products of either said biopolymers or said derivatives thereof, and said symbols, numerals, or a combination thereof, obtained by said signal processing method represents a base sequence of said biopolymers.

18. The signal processing method in autoradiography as claimed in claim 17, wherein said biopolymers are nucleic acids, derivatives thereof or cleavage products thereof, and said symbol, numeral or combination thereof obtained by said signal processing represents base sequence thereof.

19. A signal processing method for processing an autoradiograph recorded on a support medium and containing a base sequence of DNA or a DNA fragment, employing at least five groups of base specific cleavage products comprising:
(1) a mixture of guanine specific cleavage products, adenine specific cleavage products thymine specific cleavage products and cytosine specific cleavage products;
(2) guanine specific cleavage products;
(3) a mixture of guanine specific cleavage products and adenine specific cleavage products;
(4) a mixture of thymine specific cleavage products and cytosine specific cleavage products; and
(5) cytosine specific cleavage products,
which are obtained by specific cleavage of the DNA or DNA fragment which has been labeled with a radioactive element where each of said groups is resolved in at least one one dimensional direction so that said groups are in substantial parallel relation to each other to form resolved rows on the support medium,
said signal processing method including the steps of:
(1) generating digital image data where the data comprises sets of digital signals corresponding to the autoradiograph including the row of cleavage products;
(2) utilizing an internal reference row comprising the resolved row of said mixture (1) of base specific cleavage products;
(3) scanning selected digital signals of said digital image data to generate further signals representative of predetermined portions of said rows of cleavage products where the positions of said portions are at least partially determined by their locations in the scanning direction and the amounts of said radioactively labeled cleavage products at said locations are at least partially determined by the amplitudes of said further signals;
(4) processing said furhter signals to detect candidate sampling points corresponding to possible locations of certain ones of said cleavage products in each row of said rows;
(5) processing said candidate sampling points statistically to determine fundamental sampling points respectively corresponding to actual locations of said certain ones of said cleavage products;
(6) detecting the remaining sampling points in each of said resolved rows based on said fundamental sampling points to obtain signals representative of the locations of the remaining cleavage products in said sample; and
(7) comparing and identifying the positions of said sampling points in each of the resolved rows to obtain locational information on said guanine, adenine, thymine and cytosine;
(8) said digital image data being generated by (a) exposing a radiosensitive material to radiation emitted by said groups of radioactively labeled cleavage products on the support medium to record the autoradiograph of the groups of radioactively labeled cleavage procucts on the radiosensitive material, and (b) reading out said autoradiograph photoelectrically to obtain said converting the detected light autoradiograph into digital image data.

20. The signal processing method in autoradiography as claimed in claim 19, wherein said statistical processing of the candidate sampling points to determine the fundamental sampling points comprises the steps of:
(1) approximating said candidate sampling points with the following equation (1):

$$W_{On} = a - b \log (A + M_n) \qquad (1)$$

wherein $W_{On}$ represents the distance between one of the candidate sampling points on one of the resolved rows and the starting point of the resolved row, n represents the number of the sampling point corresponding to said one candidate point, and A and M are constant values, where a and b are calculated by substituting values of $W_{On}$ and n into Equation (1) to solve at least two equations with two unknowns—namely a and b; and
(2) determining the fundamental sampling points using the equation (1) with the calculated values of a and b.

21. A signal processing method for processing an autoradiograph recorded on a support medium and containing a base sequence of DNA or DNA fragment, employing at least four groups of base specific cleavage products consisting of:
(1) a mixture of guanine specific cleavage products;
(2) a mixture of guanine specific cleavage products and adenine specific cleavage products;
(3) cytosine specific cleavage products,
which are obtained by specific cleavage of the DNA or DNA fragment which has been labeled with a radioactive element where each of said groups is resolved in at least one one dimensional direction so that said groups are in substantial parallel relation to each other to form resolved rows on the support medium,
said signal processing method including the steps of:
(1) generating digital image data where the data comprises sets of digital signals corresponding to the autoradiograph including the rows of cleavage products;
(2) synthesizing an internal reference row from the resolved rows;
(3) scanning selected digital signals of said digital image data to generate further signals representative of predetermined portions of said rows of cleavage products where the positions of said portions are at least partially determined by their locations in the scanning direction and the amounts of said radioactively labeled cleavage products at said locations are at least partially determined by the amplitudes of said further signals;
(4) processing said further signals to detect candidate sampling points corresponding to possible locations of certain ones of said cleavage products in each of said rows;
(5) processing said candidate sampling points statistically to determine fundamental sampling points respectively corresponding to actual locations of said certain ones of said cleavage products;
(6) detecting the remaining sampling points in each of said the resolved rows based on said fundamental sampling points to obtain signals representative of the locations of the remaining cleavage products in said samples;
(7) comparing and identifying the positions of said sampling points on the resolved rows to obtain locational information on said guanine, adenine, thymine and cytosine,
(8) said digital image data being generated by (a) exposing a radiosensitive material to radiation emitted by said groups of radioactively labeled cleavage products on the support medium to record the autoradiograph of the groups of radioactively labeled cleavage products on the radiosensitive material, and (b) reading out said autoradiograph photoelectrically to obtain said digital image data.

22. The signal processing method in autoradiography as claimed in claim 21, wherein said statistical processing for the candidate sampling points to determine the fundamental sampling points comprises the steps of:
(1) approximating each candidate sampling point with the following equation (1):

$$W_{On} = a - b \log (A + M_n) \qquad (1)$$

wherein $W_{On}$ represents the distance between one of the candidate sampling points on one of the resolved rows and the starting point of the resolved row, n represents the number of the sampling point corresponding to said one candidate point, and A and M are constant values, where a and b are calculated by substituting values of $W_{On}$ and n into Equation (1) to solve at least two equations with two unknowns—namely a and b; and
(2) determining the fundamental sampling points using the equation (1) with the calculated values of a and b.

23. A signal processing method for processing an autoradiograph recorded on a support medium and containing the base sequence of DNA or a DNA fragment, employing at least four groups of base specific cleavage products respectively consisting of:
(1) guanine specific cleavage products;
(2) adenine specific cleavage products;
(3) thymine specific cleavage products; and
(4) cytosine specific cleavage products,
which are obtained by specific cleavage of the DNA or DNA fragment which has been labeled with a radioactive element where each of said groups is resolved in at least one one dimensional direction so that said groups are in substantial parallel relation to each other to form at least four resolved rows on a support medium,
said signal processing method including the steps of:
(1) generating digital image data where the data comprises sets of digital signals corresponding to the autoradiograph including the row of distributed substances;
(2) synthesizing a signal representative of an internal reference row from the digital image data repesenting said resolved rows where said internal reference row includes candidate sampling points for all four groups of said base specific cleavage products and determining fundamental sampling points respectively corresponding to said candidate sampling points with respect to said internal reference row; and
(3) analyzing the digital signals representative of the radioactively labeled cleavage products present within a sampling mask corresponding to a predetermined area and movable along each of said four resolved rows to positions respectively corresponding to the positions of the fundamental sampling points on the internal reference row to detect sampling points in each resolved row by utilizing the exclusiveness of the sampling points corresponding to each group in each row;

(4) said digital image data being obtained by (a) exposing a radiosensitive material to radiation emitted by said groups of radioactively labeled cleavage products on the support medium to record the autoradiograph of the groups of radioactively labeled clevage products on the radiosensitive material, and (b) reading out said autoradiograph photoelectrically to obtain said digital image data.

24. The signal processing method in autoradiography as claimed in claim 23, wherein said fundamental sampling points in each resolved rows are detected by subjecting the digital signals to smoothing, threshold-processing and statistical processing.

25. A signal processing method for processing an autoradiograph recorded on a support medium and containing a base sequence of DNA or a DNA fragment, employing at least four groups of base specific cleavage products respectively consisting of:
  (1) guanine specific cleavage products;
  (2) adenine specific cleavage products;
  (3) thymine specific cleavage products; and
  (4) cytosine specific cleavage products,
which are obtained by specific cleavage of the DNA or DNA fragment which has been labeled with a radioactive element where each of said groups is resolved in at least one one dimensional direction so that said groups are in substantial parallel relation to each other to form at least four resolved rows on a support medium,
said signal processing method including the steps of:
  (1) generating digital image data where the data comprises sets of digital signals corresponding to the autoradiograph including the row of distributed substances;
  (2) determining fundamental sampling points with respect to an internal reference row, said internal reference row comprising the resolved row of said mixture (5) of base specific cleavage products; and
  (3) analysing the digital signals representative of the radioactively labeled cleavage products present within a sampling mask corresponding to a predetermined area and movable along at least certain ones of said resolved rows to positions respectively corresponding to the positions of the fundamental sampling points on the internal reference row to detect sampling points in each resolved row by utilizing the exclusiveness of the sampling pints corresponding to each group in each row;
  (4) said digital image data being obtained by (a) exposing a radiosensitive material to radiation emitted by said groups of radioactively labeled cleavage products to obtain said digital image data.

26. The signal processing method in autoradiography as claimed in claim 25, wherein said fundamental sampling points in each resolved rows are detected by subjecting the digital signals to smoothing, threshold-processing and statistical processing.

27. A signal processing method for processing an autoradiograph recorded on a support medium and containing that base sequence of DNA or a DNA fragment, employing at least two groups of base specific cleavage products respectively comprising:
  (1) single base specific cleavage products or a mixture of two or three kinds of base specific cleavage products selected from the group consisting of guanine specific cleavage products, adenine specific cleavage products, thymine specific cleavage products and cytosine specific cleavage products; and
  (2) a mixture of two, three or four kinds of base specific cleavage products containing at least one kind of the base specific cleavage products included in the above group (1),
which are obtained by specific cleavage of the DNA or DNA fragment which has been labeled with a radioactive element where each of said groups is resolved in at least one one dimensional direction so that said groups are in substantial parallel relation to each other to form at least two resolved rows respectively containing groups (1) and (2) on a support medium,
said signal processing method including the steps of:
  (1) generating digital image data where the data comprises sets of digital signals correponding to the autoradiograph including the row of distributed substances;
  (2) operating on the digital signals representing the resolved row of the group (1) and the resolved row of the above group (2) with respect to the corresponding positions on each resolved row to obtain a mathematically constructed resolved row; and
  (3) determining sampling points with respect to said constructed resolved row;
  (4) said digital image data being obtained by exposing a radiosensitive material to radiation emitted by said groups of radioactively labeled cleavage products on the support medium to record the autoradiograph of the groups of radioactively labeled clevage products on the radiosensitive material, and reading out said autoradiograph photoelectrically to obtain said digital image data.

28. The signal processing method in autoradiography as claimed in claim 27, wherein said sampling points are determined by subjecting the digital signals corresponding to each said constructed resolved row to smoothing and/or threshold-processing.

29. The signal processing method in autoradiography as claimed in claim 27 or 28, wherein said group (2) consists essentially of a combination of the base specific cleavage products of said group (1) and another kind of base specific cleavage product, and said operation in step (2) is performed by subtraction.

30. The signal processing method in autoradiography as claimed in claim 29, wherein the combination of said group (1) and said group (2) is selected from the combinations consisting of (A):
  (1) guanine specific cleavage products; and
  (2) a mixture of guanine specific cleavage products and adenine specific cleavage products,
(B) (1) cytosine specific cleavage products; and (2) a mixture of thymine specific cleavage products; and cytosine specific cleavage products or
(C) a mixture of combinations (A) and (B).

* * * * *